United States Patent
Virtanen et al.

(10) Patent No.: US 8,820,456 B2
(45) Date of Patent: Sep. 2, 2014

(54) CAB SUSPENSIONS

(75) Inventors: Totte Virtanen, Jyvaskyla (FI); Simo Sinkko, Suolahti (FI)

(73) Assignee: Voltra Oy Ab, Suolahti (FI)

( * ) Notice: Subject to any disclaimer, the term of this patent is extended or adjusted under 35 U.S.C. 154(b) by 0 days.

(21) Appl. No.: 12/996,639

(22) PCT Filed: Jun. 4, 2009

(86) PCT No.: PCT/IB2009/005862
§ 371 (c)(1),
(2), (4) Date: Dec. 7, 2010

(87) PCT Pub. No.: WO2009/150508
PCT Pub. Date: Dec. 17, 2009

(65) Prior Publication Data
US 2011/0079457 A1    Apr. 7, 2011

(30) Foreign Application Priority Data
Jun. 11, 2008 (GB) .................................. 0810634.6

(51) Int. Cl.
*B62D 33/06* (2006.01)
*B62D 33/10* (2006.01)

(52) U.S. Cl.
USPC ................. 180/89.12; 280/5.507; 296/190.07

(58) Field of Classification Search
USPC ............. 180/89.12–89.16; 280/5.507, 5.508, 280/5.513–5.515, 5.519, 6.157; 296/35.1, 296/190.01, 190.05, 190.07
IPC ................. B62D 33/063,33/067, 33/077, 33/10
See application file for complete search history.

(56) References Cited

U.S. PATENT DOCUMENTS

| | | | |
|---|---|---|---|
| 3,944,017 A * | 3/1976 | Foster .......................... | 180/89.15 |
| 4,330,149 A | 5/1982 | Salmon | |
| 4,438,970 A * | 3/1984 | Boucher .................. | 296/190.07 |
| 4,451,079 A * | 5/1984 | Takahashi ................ | 296/190.07 |
| 4,452,329 A * | 6/1984 | Stone et al. ................ | 180/89.15 |
| 4,463,818 A * | 8/1984 | Sonneborn ................ | 180/89.15 |

(Continued)

FOREIGN PATENT DOCUMENTS

| | | | | |
|---|---|---|---|---|
| EP | 426510 A1 * | 5/1991 | ............. | B62D 33/06 |
| EP | 1645494 | 4/2006 | | |
| GB | 2388826 | 11/2003 | | |
| JP | 2001301651 A * | 10/2001 | ............. | B62D 24/02 |

OTHER PUBLICATIONS

International Search Report for International Application No. PCT/IB2009/005862 dated Sep. 29, 2009.

(Continued)

*Primary Examiner* — Ruth Ilan
*Assistant Examiner* — Laura Freedman

(57) ABSTRACT

A tractor cab suspension system has a single support unit which mounts one end of the cab from a chassis of a tractor. The single support unit acts as a noise isolator and does not allow significant vertical oscillation of the cab relative to the chassis but allows the cab to pivot relative to the chassis in pitch and roll modes. A cab support is provided at the other end of the cab which supports the cab from the chassis and damps pitching of the cab about the single support. A roll damper is also provided to damp rolling of the cab about the single support, and a control bar extends between the cab and chassis which controls transverse movement of the cab relative to the chassis.

2 Claims, 3 Drawing Sheets

(56) References Cited

U.S. PATENT DOCUMENTS

| | | | |
|---|---|---|---|
| 4,483,409 A * | 11/1984 | Fun | 180/89.15 |
| 4,998,592 A * | 3/1991 | Londt et al. | 180/89.12 |
| 5,044,455 A * | 9/1991 | Tecco et al. | 180/89.13 |
| 5,109,939 A * | 5/1992 | Conaway et al. | 180/89.15 |
| 5,299,651 A * | 4/1994 | Wilson | 180/89.12 |
| 5,553,911 A * | 9/1996 | Bodin et al. | 296/190.07 |
| 5,555,501 A * | 9/1996 | Furihata et al. | 701/37 |
| 5,603,387 A * | 2/1997 | Beard et al. | 180/89.12 |
| 5,623,410 A * | 4/1997 | Furihata et al. | 701/37 |
| 5,642,282 A * | 6/1997 | Sonehara | 701/37 |
| 5,899,288 A * | 5/1999 | Schubert et al. | 180/89.12 |
| 6,070,681 A * | 6/2000 | Catanzarite et al. | 180/89.15 |
| 6,116,367 A * | 9/2000 | Roberts | 180/89.15 |
| 6,206,121 B1 * | 3/2001 | Michel | 180/89.13 |
| 6,758,294 B2 * | 7/2004 | Peddycord et al. | 180/89.12 |
| 7,240,754 B2 * | 7/2007 | Barta et al. | 180/89.12 |
| 7,300,100 B2 * | 11/2007 | McLean et al. | 296/190.07 |

OTHER PUBLICATIONS

UK Search Report for Application No. GB0810634.6 dated Oct. 13, 2008.

* cited by examiner

CAB SUSPENSIONS

BACKGROUND OF THE INVENTION

This invention relates to cab suspensions and in particular to suspension for mounting a cab on the chassis of an agricultural tractor or similar utility vehicle.

BRIEF SUMMARY OF THE INVENTION

It is an object of the invention to provide a cab suspension which allows control of pitching of the cab (i.e. pivoting of the cab about a generally transverse axis relative to the chassis) and also roll of the cab (i.e. pivoting of the cab about a generally longitudinal axis relative to the chassis).

Thus in accordance with the present invention there is provided a tractor cab suspension system comprising a single support unit which mounts one end of the cab from a chassis of a tractor, the single support unit acting as a noise isolator and not allowing significant vertical oscillation of the cab relative to the chassis but allowing the cab to pivot relative to the chassis in pitch and roll modes, cab support means at the other end of the cab which supports the cab from the chassis and damps pitching of the cab about the single support, roll damper means to damp rolling of the cab about the single support, and a control means which extends between the cab and chassis and which controls transverse movement of the cab relative to the chassis.

In its simplest form the cab support means comprises a pair of spring/damper units located adjacent the corners of said other end of the cab, said pair of spring/damper units also acting as the roll damper means.

Preferably, however the roll damper means is separate from the pitch damping provided by the cab support means.

With such an arrangement the control of the pitching of the cab, by the cab support means, can be separate from the control of the roll of the cab by the roll damper means. This allows the pitch damping to be optimised for the higher frequency pitching of the cab and the roll damping to be optimised for the lower frequency roll of the cab.

For example, the cab support means may comprise a pair of spring/damper units located adjacent the corners of said other end of the cab, and the roll damper means comprises a damper unit at said one end of the cab located to one side of said single vibration isolating support.

Alternatively, the cab support means may comprise a single spring/damper unit located at the other end of the cab, and the roll damper means comprises a damper unit at said one end of the cab located to one side of said single vibration isolating support.

In both of the above arrangements the roll damper means may comprise a pair of damper units at said one end of the cab located one on each respective side of the single vibration isolating support.

The cab support means and roll dampers means may be passive units with fixed damping characteristics.

Alternatively the cab support means and roll damper means may have variable damping characteristics to provide a semi-active system.

In a still further alternative the cab support means and the roll damper means are connected with a pressurised fluid supply circuit which controls the ride height, spring force and damping characteristics of each unit to provide an active damping system.

BRIEF DESCRIPTION OF THE DRAWINGS

The present invention will now be described, by way of example only, with reference to the accompanying drawings in which:—

DETAILED DESCRIPTION OF THE INVENTION

Figure 1:
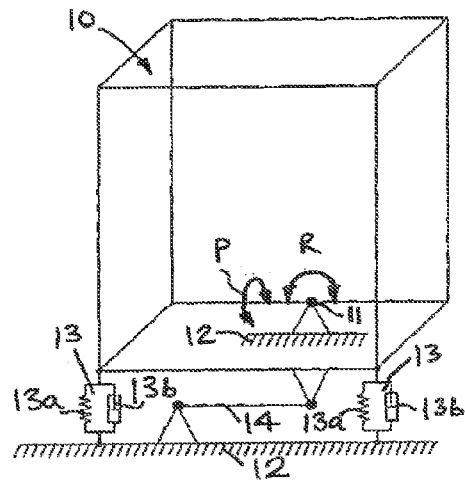
FIGS. 1 to 4 shows diagrammatically different forms of tractor cab suspension in accordance with the present invention.

Referring to the drawings, FIG. 1 shows diagrammatically the simplest form of tractor cab suspension in accordance with the present invention in which the cab 10 is provided at its front end with a single rubber type vibration isolating mount (or ball joint) 11 which is connected between the cab 10 and the tractor chassis 12. This mount 11 acts as a noise isolator and allows the cab to pitch and roll about this mount as indicated by arrows P and R without any significant vertical movement at the mount. Typically the amplitude of vertical movement at mount 11 is less than 10 mm (i.e. total travel of less than 20 mm). At the rear of the cab, two cab suspension supports 13 are connected between the cab and the chassis 12. Each of these suspension units includes a spring function 13a and a damping function 13b. These suspension units control pitch of the cab about the front mount 11 as indicated by the arrow P in FIG. 1 and roll about the front mount 11 as indicated by arrow R.

A control bar 14 also extends between the cab 10 and the chassis 14 to control transverse movement of the cab relative to the chassis 12.

In this first cab suspension arrangement the support units 13 thus control both the pitch of the cab about the front mount 11 and also the roll of the cab about mount 11.

Figure 2:
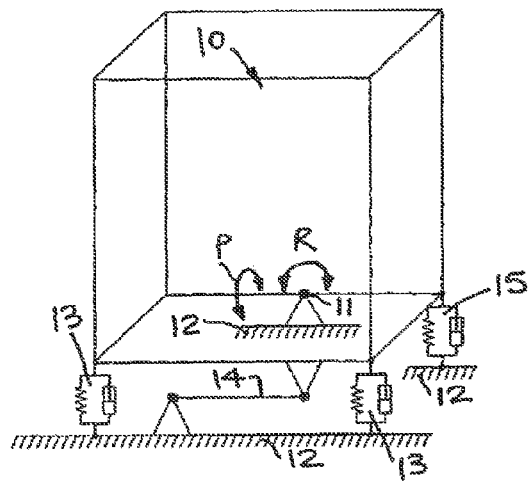

In a preferred form of the invention shown in FIG. 2, the rear cab mounts 13 control the pitch P of the cab about the front mount 11 and the roll R of the cab about the front mount 11 is controlled by a separate damping unit 15 connected between a front corner of the cab and the chassis 12. By separating the damping of the pitch and roll into separate units the pitch damping can be optimised for the higher frequency pitching of the cab and the roll damping optimised for the lower roll frequency of the cab.

Figure 4:
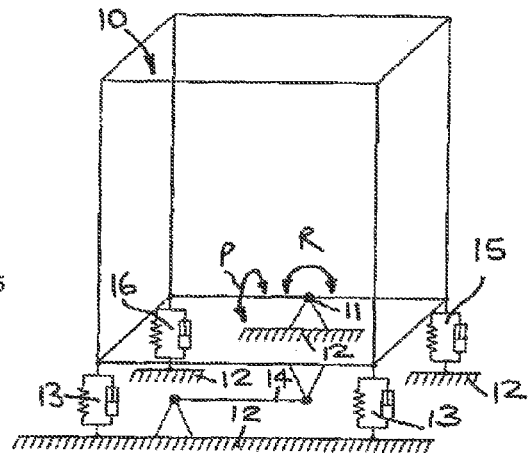

In the arrangement shown in FIG. 4 the single damping unit 15 is augmented by a second damping unit 16 positioned on the other side of the front mount 11. In this arrangement the rear support units 13 control the pitch P of the cab about the front mount 11 and the damping units 15 and 16 control the roll R about the front mount 11. Again the pitch and roll damping can be optimised since it is controlled by separate units.

Figure 3:
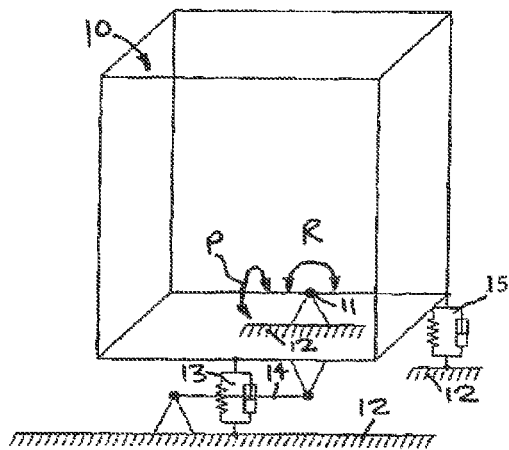

FIG. 3 shows a still further form of the present invention in which the two rear mounting units 13 are replaced by a single unit 13 connected with the central region of the cab and acting between the cab and chassis 12. In the arrangement shown in FIG. 4 the pitch P of the cab about the front mount 11 is controlled by the single rear unit 13 and the roll R is controlled by a single damper 15 in a simple manner to the arrangement shown in FIG. 2. This configuration again allows separate pitch and roll control for more accurate total control of the cab movement.

Figure 8:
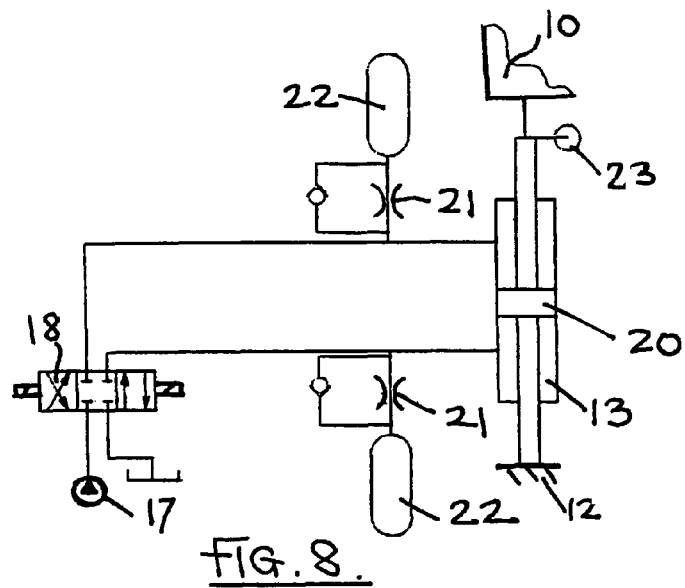
FIG. 8 shows diagrammatically a hydraulic circuit for a passive form of springing and damping for use in a tractor cab suspension in accordance with the present invention.
Figure 9:
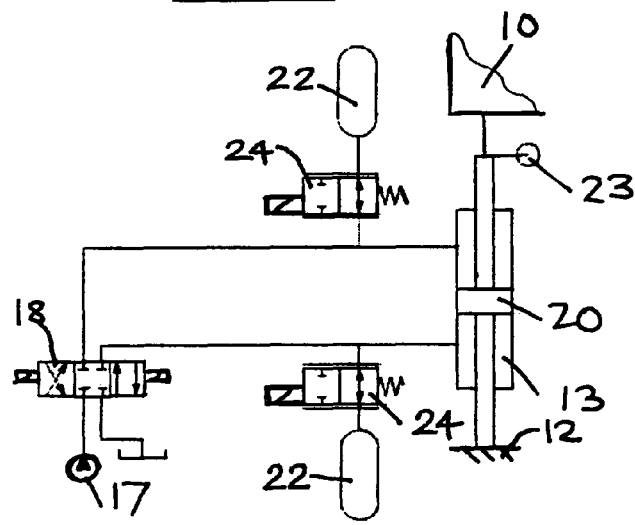
FIG. 9 shows diagrammatically a hydraulic circuit for a semi-active form of springing and damping for use in a tractor cab suspension in accordance with the present invention.
Figure 10:
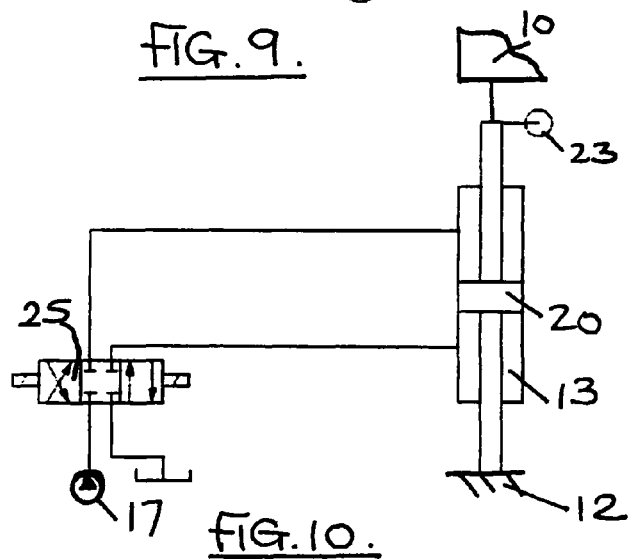
FIG. 10 shows diagrammatically a hydraulic circuit for an active form of springing and damping for use in a tractor cab suspension in accordance with the present invention.

As will be appreciated, the various support units 13 shown in the configurations of FIGS. 1 to 4 can be connected to act either passively, semi-actively or fully actively using hydraulic connections as shown diagrammatically in FIGS. 8, 9 and 10 respectively.

In the arrangement shown in FIG. 8 the or each support unit 13 is connected with a source of fluid pressure (which could be hydraulic or pneumatic) from a pump 17 via a fluid flow control valve 18. Normally control valve 18 remains closed so that any movement between the cab 10 and the chassis 12 results in movement of a piston 20 of the support unit 13 and the movement of fluid from one side to the other of the piston 20 via fixed orifices 21 into associated accumulators 22. Thus a fixed damping and spring support characteristic is provided which does not vary with the operating conditions of the tractor.

The control valve 18 is provided so that fluid can be omitted either above or below the piston 20 to adjust the height of the cab relative to the chassis 12 at the request of the tractor driver so that the cab can be raised and lowered for different operating conditions and the cab can even be tilted from side to side if the tractor is operating across a sloping field. A position sensor 23 is provided which supplies signals indicative of the position of piston 20 so that a required ride height of the cab can be maintained by the system.

The circuitry shown in FIG. 9 is basically the same as that of FIG. 8 with the exception that the fixed orifices 21 are replaced by variable orifices in the form of proportional fluid control valves 24 which receive control signals from an associated electronic control unit into which the tractor driver can enter his requirement for harder or softer cab damping and which can also be controlled automatically by an electronic monitoring system in response to the speed and movement of the cab relative to the chassis. In this arrangement in addition to the position sensor 23 a cab inclinometer and/or or a gyroscope (or two accelerometers) are provided to generate the input signals for automatically controlling the size of the orifices provided by the valves 24 which, as explained above, will vary in accordance with the speed and degree of movement of the cab relative to the chassis. Again the ride height and inclination of the cab can be controlled by valve 18 to adjust the amount of fluid above or below the piston 20

FIG. 10 shows a fully active spring and damping system in which the pressure above and below the piston 20 and the movement of piston 20 is controlled by a proportional flow valve 25 to provide the necessary spring support and damping functions in response to the vertical, pitch and roll movements of a cab relative to the chassis. In this active control system the valve 25 will again receive operating signals from an associated electronic control unit into which the tractor driver can enter his requirement for harder or softer cab damping and which can also be controlled automatically by an electronic monitoring system in response to the speed and movement of the cab relative to the chassis. In this arrangement in addition to the position sensor 23 a cab inclinometer and/or or a gyroscope (or two accelerometers) are provided to generate the input signals for automatically controlling the size of the orifices provided by the valves 25 which, as explained above, will vary in accordance with the speed and degree of movement of the cab relative to the chassis. Again the ride height and inclination of the cab will also be controlled by the valve 25 by adjusting the amount of fluid above or below the piston 20.

Figure 5:
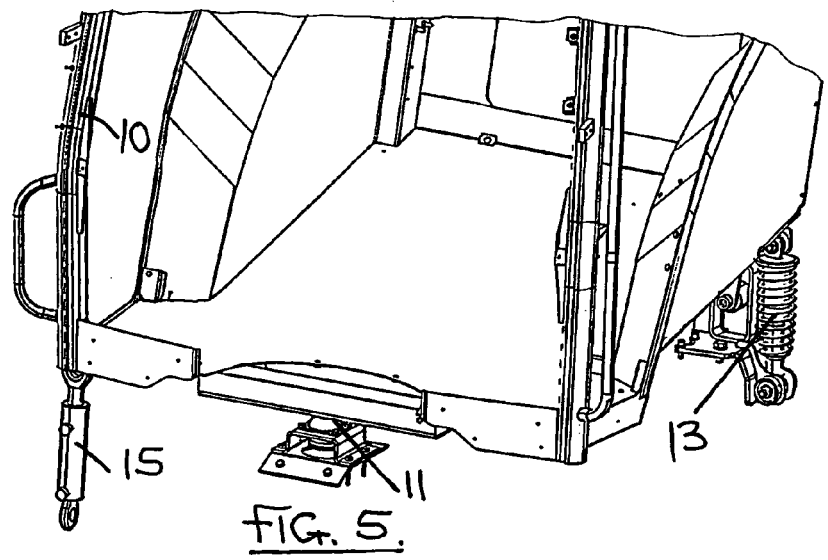
FIGS. 5 to 7 show perspective views of the suspension arrangement of FIG. 1.
Figure 6:
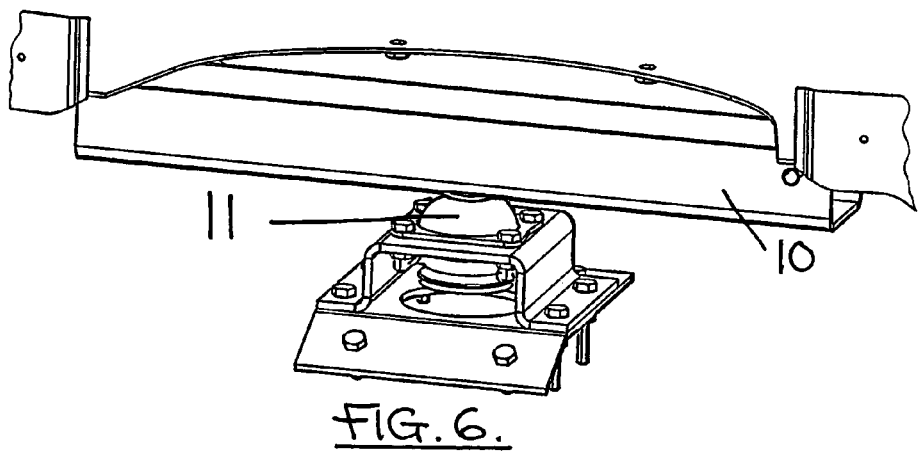
Figure 7:
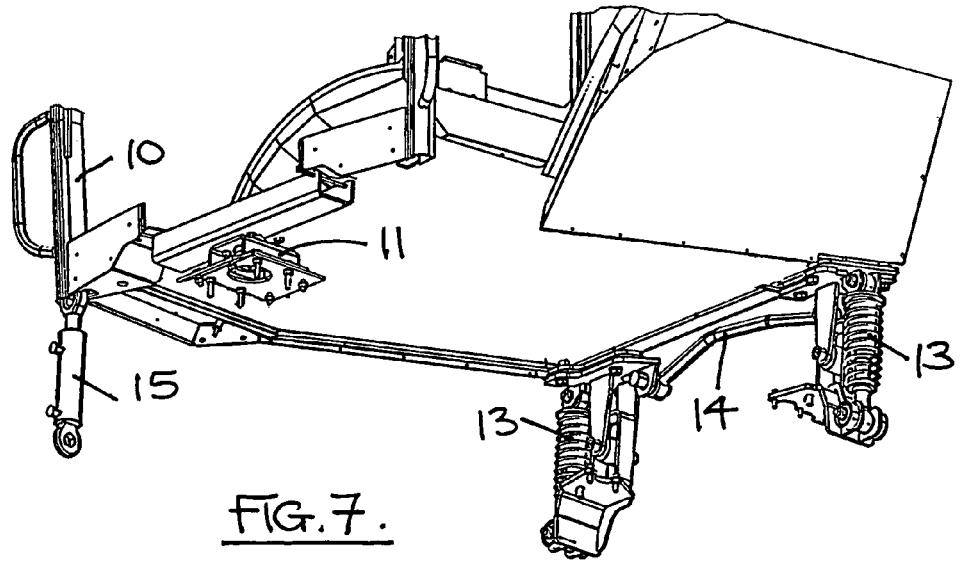

FIGS. 5, 6 and 7 show in more detail the cab suspension arrangement of FIG. 2 with its central front vibration isolating mount 11 which is of the conventional rubber type and its rear hydraulic (or pneumatic) support units 13 which provide a spring and damping capability. Also, mounted to the front right hand corner of the cab when viewing the cab from the driver's seat, is the single damping unit 15 which acts between the cab and the chassis 12.

As will be appreciated the mounting arrangement of the present invention provides a simple but efficient method of controlling both the pitch and roll of the cab relative to the tractor chassis. In arrangements shown in FIGS. 2, 3 and 4 are particularly advantageous since the pitch and roll control is undertaken by separate units thus allowing pitch and roll to be separately controlled for optimum cab suspension control.

The invention claimed is:

1. A tractor cab suspension system comprising:
a single support unit which mounts one end of a cab from a chassis of a tractor;
the single support unit acting as a noise isolator and not allowing significant vertical oscillation of the cab relative to the chassis but allowing the cab to pivot relative to the chassis in pitch and roll modes;
the single support unit being located centrally along said one end of the cab;
cab support means at the other end of the cab which supports the cab from the chassis and damps pitching of the cab about the single support unit, in which the cab support means comprises a pair of spring/damper units located adjacent corners of said other end of the cab;
roll damper means to damp rolling of the cab about the single support unit, wherein the roll damper means comprises a damper unit at said one end of the cab located to one side of said single support unit; and,
a control means which extends between the cab and chassis and which controls transverse movement of the cab relative to the chassis.

2. A tractor cab suspension system comprising:
a simile support unit which mounts one end of a cab from a chassis of a tractor;
the single support unit acting as a noise isolator and not allowing significant vertical oscillation of the cab relative to the chassis but allowing the cab to pivot relative to the chassis in pitch and roll modes;
the single support unit being located centrally along said one end of the cab;
cab support means at the other end of the cab which supports the cab from the chassis and damps pitching of the cab about the single support unit;
roll damper means to damp rolling of the cab about the single support unit; and,
a control means which extends between the cab and chassis and which controls transverse movement of the cab relative to the chassis;
in which the cab support means and the roll damper means are connected with a pressurized fluid supply circuit which controls a ride height of the cab, and spring force characteristics and damping characteristics of each of the roll damper means and cab support means to provide an active damping system.

* * * * *